US009702752B2

(12) United States Patent
Feldotte et al.

(10) Patent No.: US 9,702,752 B2
(45) Date of Patent: Jul. 11, 2017

(54) ELECTROMAGNETICALLY FORCE-COMPENSATING FORCE-MEASURING APPARATUS

(71) Applicant: Sartorius Lab Instruments GmbH & Co. KG, Goettingen (DE)

(72) Inventors: Heinrich Feldotte, Goettingen (DE); Heyko Holst, Goettingen (DE)

(73) Assignee: Sartorius Lab Instruments GmbH & Co. KG, Goettingen (DE)

( * ) Notice: Subject to any disclaimer, the term of this patent is extended or adjusted under 35 U.S.C. 154(b) by 263 days.

(21) Appl. No.: 14/511,900

(22) Filed: Oct. 10, 2014

(65) Prior Publication Data

US 2015/0027792 A1 Jan. 29, 2015

Related U.S. Application Data

(63) Continuation of application No. PCT/EP2013/000838, filed on Mar. 20, 2013.

(30) Foreign Application Priority Data

Apr. 10, 2012 (DE) ......................... 10 2012 103 037

(51) Int. Cl.
*G01G 7/04* (2006.01)
(52) U.S. Cl.
CPC ........................................ *G01G 7/04* (2013.01)
(58) Field of Classification Search
CPC    G01G 7/02; G01G 7/04; G01G 23/48; G01G 3/1412; G01G 3/1414;
(Continued)

(56) References Cited

U.S. PATENT DOCUMENTS 4,099,587 A * 7/1978 Kaufmann ............... G01G 7/04
177/210 EM
4,159,747 A * 7/1979 Realini ..................... G01G 7/04
177/210 EM
(Continued)

FOREIGN PATENT DOCUMENTS

DE        2400881 A1    7/1975
DE        3149990 A1    6/1983
(Continued)

OTHER PUBLICATIONS

International Search Report in counterpart International Application No. PCT/EP2013/000838, mailed May 3, 2013.

*Primary Examiner* — Natalie Huls
(74) *Attorney, Agent, or Firm* — Edell, Shapiro & Finnan, LLC

(57) ABSTRACT

An electromagnetically force-compensating force-measuring apparatus (100) that includes a force dependent support coil (2) and an integrating analog/digital converter (10; 10') that converts the coil current ($I_S$) into a digital output signal. A current/voltage converter (6) is connected downstream of the support coil (2), the output of the current/voltage converter being connected to a measurement voltage input (14) of the analog/digital converter (10; 10') and to the input of a voltage amplifier (8). The resistance value of a first heating resistor ($R_{SH}$) is equal to the resistance value of the support coil (2), the resistance value of a second heating resistor ($R_{WH}$) is equal to the conversion factor ($R_W$) of the current/voltage converter (6) and the gain factor of a voltage amplifier (8) is equal to the ratio of the resistance value of the first heating resistor to the resistance value of the second heating resistor.

4 Claims, 5 Drawing Sheets

(58) Field of Classification Search
CPC .... G01G 19/414; G01G 21/244; G01G 23/01; G01G 23/012
See application file for complete search history.

(56) References Cited

U.S. PATENT DOCUMENTS

| | | | | |
|---|---|---|---|---|
| 4,300,647 A * | 11/1981 | Knothe | ................ | G01G 19/414 177/210 EM |
| 4,420,055 A * | 12/1983 | Grutzediek | ............ | G01G 7/045 177/212 |
| 4,450,923 A * | 5/1984 | Behrend | ................... | G01G 7/04 177/210 EM |
| 4,450,924 A * | 5/1984 | Behrend | ............. | G01G 21/244 177/210 EM |
| 4,457,386 A * | 7/1984 | Schett | ..................... | G01G 7/02 177/210 EM |
| 4,489,800 A * | 12/1984 | Nufer | ....................... | G01G 7/04 177/210 EM |
| 2009/0206824 A1* | 8/2009 | Feldotte | .................. | H03M 3/34 324/123 R |
| 2009/0207064 A1* | 8/2009 | Feldotte | ............. | H03M 1/0607 341/155 |
| 2010/0294573 A1 | 11/2010 | Baltisberger et al. | | |
| 2012/0173168 A1 | 7/2012 | Koeppel et al. | | |
| 2015/0002327 A1* | 1/2015 | Feldotte | ................ | H03M 1/089 341/158 |

FOREIGN PATENT DOCUMENTS

| | | |
|---|---|---|
| EP | 2253944 A1 | 11/2010 |
| EP | 2278283 A1 | 1/2011 |

\* cited by examiner

ELECTROMAGNETICALLY FORCE-COMPENSATING FORCE-MEASURING APPARATUS

CROSS-REFERENCE TO RELATED APPLICATIONS

This is a Continuation of International Application PCT/EP2013/000838, with an international filing date of Mar. 20, 2013, which in turn claims priority to German Patent Application 10 2012 103 037.5, filed Apr. 10, 2012. The entire disclosures of both these related applications are incorporated into the present application by reference.

FIELD OF AND BACKGROUND OF THE INVENTION

The invention relates to an electromagnetically force-compensating force-measuring apparatus, comprising
 a support coil which is mounted in a permanent magnet arrangement and through which a coil current generated by a controller, depending on a force, flows during operation, and
 an integrating analog/digital converter which is designed to convert an electrical signal, which is representative of the coil current and is applied to the measurement signal input thereof, into a digital output signal,
wherein the analog/digital converter is connected at the reference voltage input thereof to a reference voltage source which has two reference voltages which have the same magnitude and are oppositely poled relative to one another, and alternately connects a reference voltage switch to an integrator of the analog/digital converter, wherein a ratio of the intervals in which the individual reference voltages are connected to the integrator within a measuring clock cycle is a measure of the presently flowing coil current.

Digital force-measuring devices operating according to the principle of electromagnetic force compensation, for example digital balances, have long been known. EP 2 253 944 A1 (which corresponds to US 2010/0294573 A1) discloses a digital balance of this type.

According to the measuring principle of electromagnetic force compensation, a support coil connected to a load arm is arranged axially movable in the air gap of a permanent magnet. Current flow through the support coil generates a magnetic field which interacts with the magnetic field of the permanent magnet and leads to a deflection of the coil and of the load arm connected thereto. The position of the load arm is detected by suitable position sensors. The current source for the coil current and the position sensors are components of a control circuit, the control variable of which is the position of the load arm and the manipulated variable of which is the current flow through the support coil. If the load arm is deflected by a force that is to be measured, this deflection is measured by the position sensors and is communicated to a controller which adjusts the current flow through the support coil such that the deflection is counteracted. The current through the support coil is therefore a direct measure of the force acting on the load arm. The coil current or a variable which is representative thereof is digitized in an analog/digital converter (abbreviated: A/D converter) connected downstream. In particular, the principle of the integrating A/D converter is well-known in the art.

A circuit diagram showing the principle of an electronic measurement value detection device 100 of a force-measuring apparatus of this type with a support coil 2, a controller 4 and an A/D converter 10 is shown in FIG. 1.

The heart of the A/D converter 10 is the integrator 12 which comprises an operational amplifier with an inverting input 122, a non-inverting input 123 and an output 124, as well as a capacitor 125 which is connected between the inverting input 122 and the output 124 of the operational amplifier 121. The non-inverting input 123 of the operational amplifier 121 is connected to a reference voltage, particularly to ground. The inverting input 122 is connected via the measuring resistor $R_M$ to the measurement voltage input 14 where the measurement voltage $U_M$, which is representative of the coil current $I_S$ flowing through the support coil, is applied during operation. In particular, the coil current $I_S$ can be converted by a current/voltage converter 6 into the measurement voltage $U_M$. Furthermore, the inverting input 122 is connected via a reference resistor $R_{Ref}$ to the reference voltage switch 16 which, depending on the switch setting, electrically connects either the first reference voltage input 18 or the second reference voltage input 20. A reference voltage $U_{Ref1}$ or $U_{Ref2}$ is applied to each of the reference voltage inputs 18, 20 which typically have inverse polarity relative to one another and can have the same voltage level. The integrator output 126 is connected to the test voltage input 221 of a comparator 22, the reference voltage input 222 of which is connected to a comparator reference voltage, which can be, for example, ground. The comparator 22 outputs a signal or a signal change at its output 223 when the test voltage applied to the test voltage input 221 corresponds to the reference voltage applied to the reference voltage input 222. The comparator output signal is fed back as the switching signal, via a control device 40, to the reference voltage switch 16.

An A/D converter of this type operates as follows: in a first phase of a measuring clock cycle T, the reference voltage switch 16 is switched such that the first reference voltage input 18 is connected. During this phase, the integrator integrates the sum of the measurement current $I_M$, which results from the drop in the measurement voltage $U_M$ across the measuring resistor $R_M$, and the reference current $I_{Ref1}$, which results from the drop in the first reference voltage $U_{Ref1}$ across the reference resistor $R_{Ref}$. After a time pre-defined by the control device 40, specifically the duration of a first measuring phase t1, which thus represents an integration phase, the reference voltage switch 16 switches over, so that the first reference voltage input 18 is disconnected and the second reference voltage input 20 is connected. Now the integrator integrates the sum of the measurement current $I_M$ and the reference current $I_{Ref2}$, which results from the voltage drop in the second reference voltage $U_{Ref2}$ across the reference resistor $R_{Ref}$. In this example, the polarities of the measurement voltage $U_M$ and the first reference voltage $U_{Ref1}$ are opposite and the polarities of the measurement voltage $U_M$ and the second reference voltage $U_{Ref2}$ are the same. The integrated and deintegrated voltage respectively lie at the integrator output 126 and therefore at the test voltage input 221 of the comparator 22.

This second measuring phase which thus represents a deintegration phase is denoted herein as $\tau$. As soon as the integrator voltage is fully deintegrated, a comparator signal is output which is used by the control device 40 to switch over the reference voltage switch 16 once more and to begin anew measuring clock cycle. Furthermore, the control device 40, which during the preceding measuring clock cycle has measured the durations of the two measuring phases $t1=T-\tau$ and $\tau$ and, in particular, has calculated the ratio of the duration of the second measuring phase $\tau$ to the measuring clock cycle duration T of the preceding measuring clock cycle, i.e. the duty factor δ=τ/T, can output a corresponding numerical value which is a measure of the measurement voltage $U_M$ applied during the measuring clock cycle and thus of the coil current $I_S$ flowing through the support coil 2.

A disadvantage of the necessary dependence of the coil current $I_S$ on the present measurement value is that the power loss arising in the support coil is also measurement value-dependent. The power loss leads to heating of the overall device so that thermal influences (faults) are also measurement value-dependent. This is not tolerable for precision measurements. The above-mentioned application EP 2 253 944 A1 (which corresponds to US 2010/0294573 A1) discloses a possibility for compensating for power losses in the support coil. It is proposed, in particular, to provide the support coil with a double winding, each partial winding being connected to a separate coil current source. The coil current sources are controlled in such a way that the total of their currents generates the electromagnetic forces required to compensate for the weight force, wherein at the same time, the power loss absorbed in the support coil remains constant.

DE 31 49 990 A1 (which corresponds to U.S. Pat. No. 4,450,923) discloses another approach. Herein, in addition to the direct current, an alternating current is also applied to the support coil, in order to generate an overtemperature in the support coil. A direct current and an alternating current proportional to the direct current and the alternating current in the support coil is passed through a strongly temperature-dependent resistor of a voltage divider circuit, in particular a glow wire, the resistance value of which is kept constant by a controller. Based on the proportionality of the currents in the support coil and in the glow wire, a constant power loss is caused in the support coil.

OBJECTS AND SUMMARY OF THE INVENTION

It is an object of the present invention to provide an alternative compensation for the power loss arising in the support coil.

This object is addressed in the context of an electromagnetically force-compensating force-measuring apparatus as recited above, in that the output of the controller is connected, via a first heating resistor which is thermally coupled to the support coil, to the output of a voltage amplifier, the input of which is connected to the output of the reference voltage switch and that a current/voltage converter is connected downstream of the support coil, the output of said current/voltage converter being connected to the measurement voltage input of the analog/digital converter and, via an inverter and a second heating resistor, to the input of the voltage amplifier
wherein
the resistance value of the first heating resistor is equal to the resistance value of the support coil,
the resistance value of the second heating resistor is equal to the conversion factor of the current/voltage converter, and
the gain factor of the voltage amplifier is equal to the ratio of the resistance value of the first heating resistor to the resistance value of the second heating resistor.

This object is further addressed in conjunction with a further electromagnetically force-compensating force-measuring apparatus in that the output of the controller is connected via an inverter, a first heating resistor which is thermally coupled to the support coil, and a second heating resistor to the output of a voltage amplifier, the input of which is connected to the output of the reference voltage switch and that a passive current/voltage converter with a shunt resistor connected to ground is connected downstream of the support coil, the output of said current/voltage converter being connected to the measurement voltage input of the analog/digital converter, wherein:
the resistance value of the first heating resistor is equal to the resistance value of the support coil,
the resistance value of the second heating resistor is equal to the resistance value of the shunt resistor, and
the gain factor of the voltage amplifier is equal to the ratio of the total of the resistance values of the first and second heating resistor to the resistance value of the second heating resistor.

Preferred embodiments of these two types of apparatuses are also disclosed and claimed herein.

Underlying the two variants of the invention is the same basic inventive concept of compensating for the power loss in the support coil using an additional heating resistor which is fed with a current which is representative of the duty factor, i.e. the measurement value. The duty factor-dependency is found by detecting the respective voltage applied, which varies temporally exactly with the duty factor. The support coil power loss is therefore not precisely compensated for at each infinitessimal time point, but always averaged over a measuring clock cycle. However, this is fully sufficient since typical measuring frequencies are in the region of several hundred Hertz and are therefore significantly faster than any thermal influences. Nevertheless, in order to realize the basic inventive concept, further elements which themselves provoke a power loss which is measurement value-dependent and therefore requires compensation are needed. In order to realize the basic inventive concept, it is therefore required that a large number of elements be considered and taken into account together, and this leads to the above-mentioned two different variants of the invention.

In a preferred embodiment of the first variant of the invention, it can be provided that the current/voltage converter has a converter resistor which is connected in series between the support coil and the input of the analog/digital converter and a difference amplifier connected in parallel thereto, the second input of which is preferably connected to ground. An embodiment of a current/voltage converter of this type is known in principle to a person skilled in the art. The conversion factor corresponds to the resistance value of the converter resistor.

In a further development of the first variant of the invention, it is provided that the inverter is a component of a power compensation circuit within the analog/digital converter. Also, within the A/D converter, the problem arises that a measurement value-dependent current flows through the measuring resistor $R_M$, which leads to a measurement value-dependent power loss in the converter. Various compensation measures which are independent of the support coil power loss compensation are conceivable and require, inter alia, the inversion of the measurement voltage. This inverted signal also plays a part in the context of the support coil power loss compensation, so that the relevant component, i.e. the inverter, can be used jointly and a component can be spared.

Further features and advantages of the invention are disclosed in the following description and the drawings.

DETAILED DESCRIPTION OF EXEMPLARY EMBODIMENTS

The same reference signs in the figures relate to the same or similar components.

Figure 1:
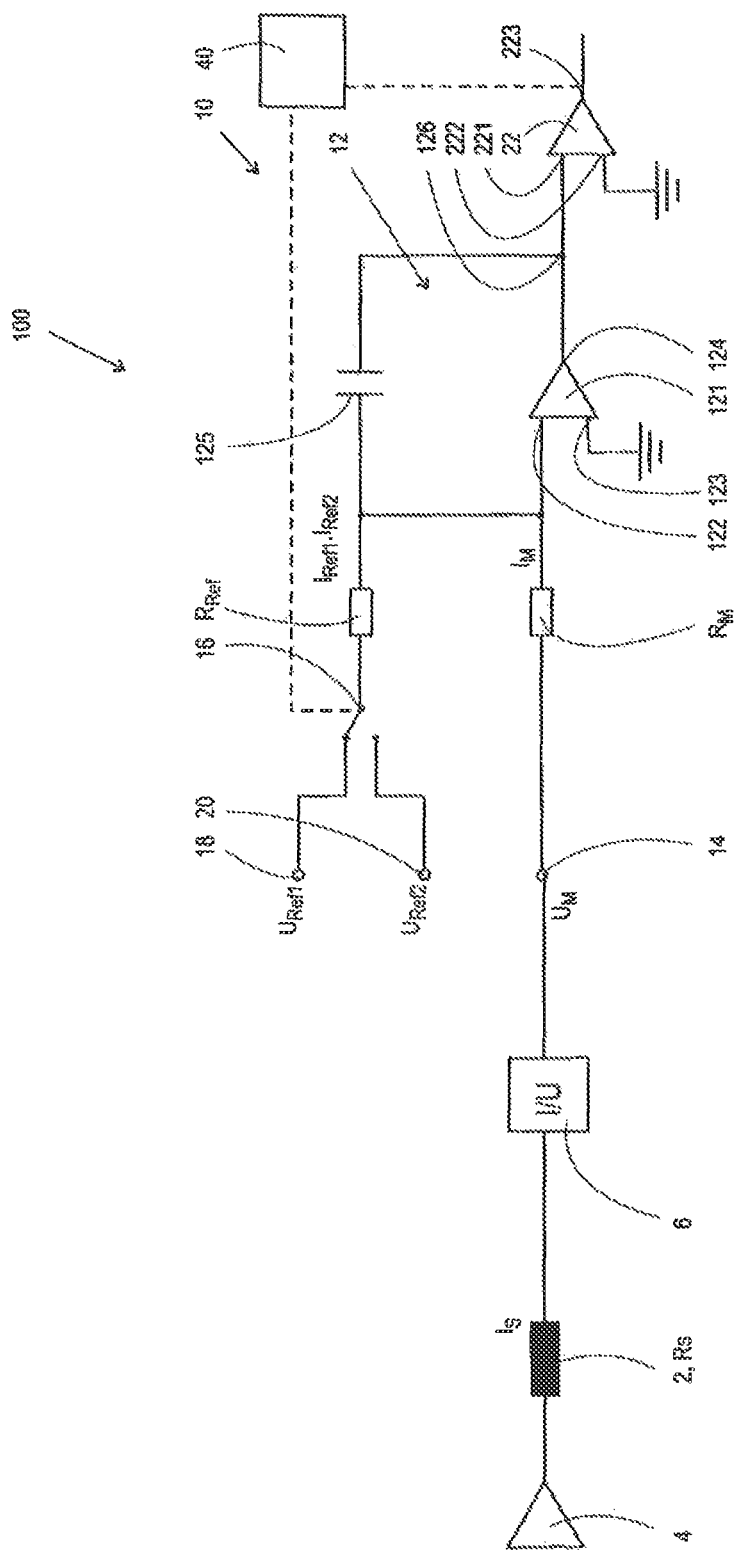
FIG. 1 is a sketch showing the principle of an electronic measurement value detection device of a conventional force-measuring apparatus.

FIG. 1 has already been described in detail above in the context of the outline of the prior art.

Figure 2:
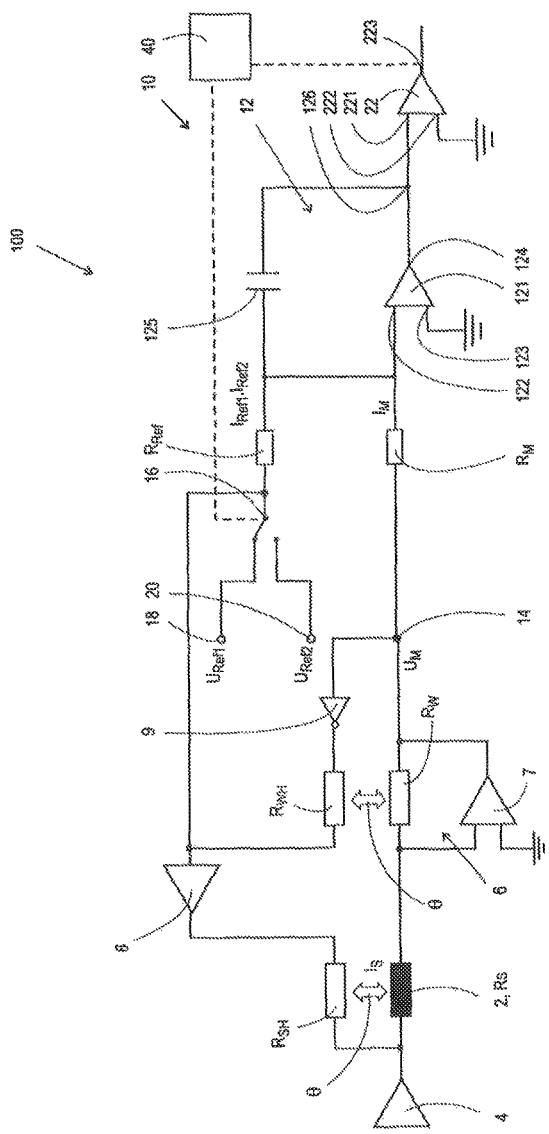
FIG. 2 is a sketch showing the principle of a first embodiment of an electronic measurement value detection device of a force-measuring apparatus according to the first variant of the invention.

FIG. 2 shows a sketch of the principle of a further development according to the invention of the device of FIG. 1. In this embodiment, the current/voltage converter 6 is configured as a converter resistor $R_W$ connected in series downstream of the support coil 2 with a difference amplifier 7 connected in parallel. The current/voltage converter 6 converts the coil current $I_S$ with a conversion factor which corresponds to the resistance value of the converter resistor $R_W$ into the measurement voltage $U_M$ which is applied to the measurement voltage input 14 of the A/D converter 10. This measurement voltage $U_M$ is applied by the inverter 9 to one side of a heating resistor $R_{WH}$, the resistance value of which is equal to the resistance value of the converter resistor $R_W$. The other side of the heating resistor $R_{WH}$ is connected to the output of the reference voltage switch 16 so that the difference between the measurement voltage and the respective present reference voltage $U_{Ref1}$ or $U_{Ref2}$ lies across the heating resistor $R_{WH}$. It should be noted herein that the time intervals within which $U_{Ref1}$ and/or $U_{Ref2}$ are applied corresponds to the duty factor δ. The reference voltage $U_{Ref1}$, $U_{Ref2}$ is also applied to the input of a voltage amplifier 8, the output of which is applied to one side of a further heating resistor $R_{SH}$, the other side of said further heating resistor being connected to the output of the controller 4. The heating resistor $R_{SH}$ is thermally coupled, as indicated by a thermal coupling arrow Θ, to the support coil 2 and has the same resistance value as said support coil. The heating resistor $R_{WH}$ is thermally coupled to the converter resistor $R_W$, as also indicated by a thermal coupling arrow Θ. With a suitable selection of the gain factor of the voltage amplifier 8, specifically $g=R_{SH}/R_{WH}$ or $g=R_S/R_W$, a constancy results, as can be shown mathematically, i.e. the duty factor-independence of the power loss which arises at the support coil 2, the converter resistor $R_W$, the heating resistor $R_{WH}$ and the heating resistor $R_{SH}$ as a total and averaged over a measuring clock cycle. The power loss is therefore no longer measurement value-dependent, so that thermal effects always have the same influence regardless of the actual measurement value.

Figure 3:
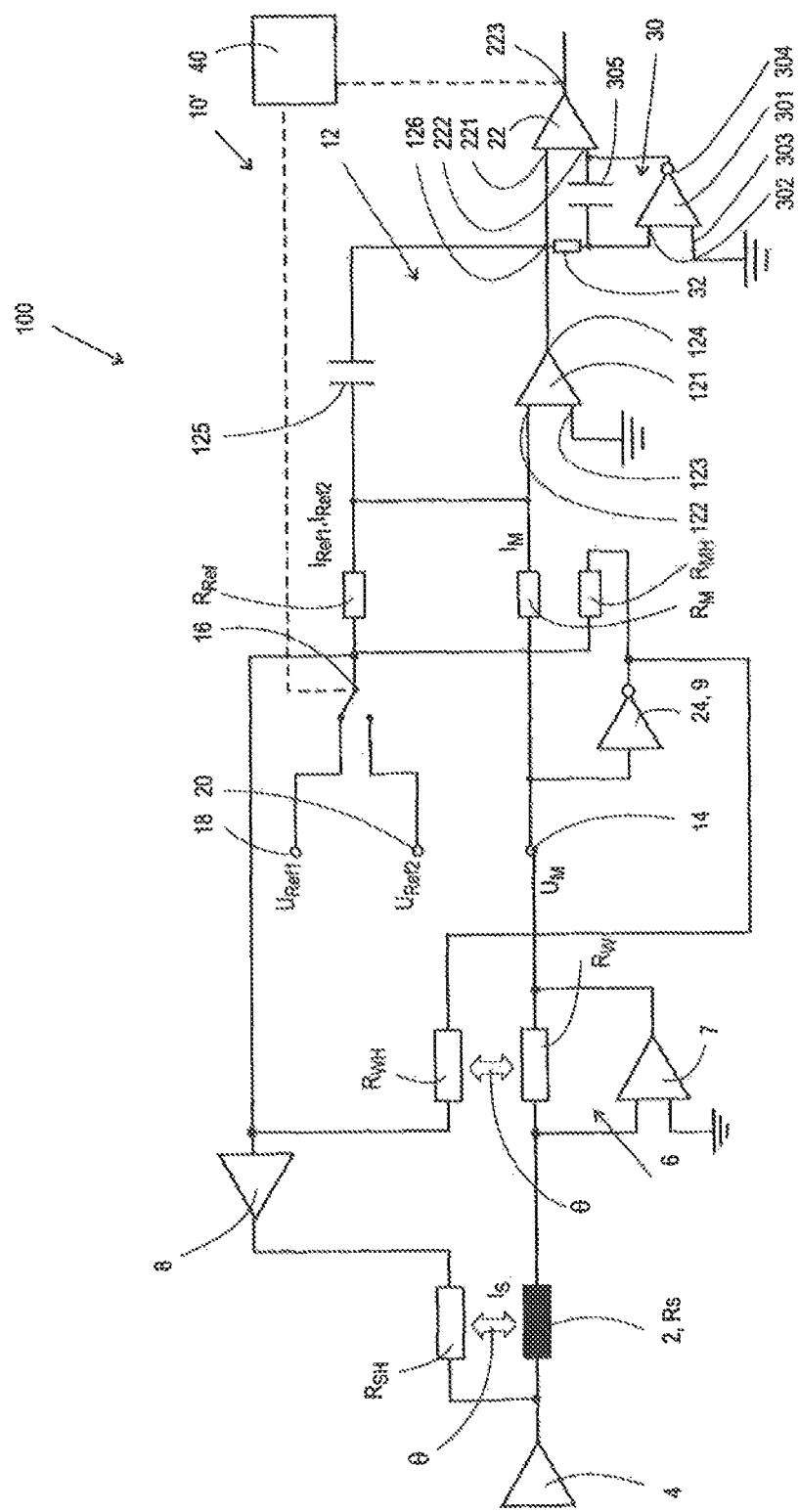
FIG. 3 is a sketch showing the principle of a second embodiment of an electronic measurement value detection device of a force-measuring apparatus according to the first variant of the invention.

FIG. 3 shows a further development of the device of FIG. 2. A compensation for the power loss in the measuring resistor $R_M$ and a direct portion compensation of the integrator voltage are provided here in the region of the A/D converter 10'. These will be described in greater detail below. With regard to the support coil power loss compensation, this variant is particularly interesting in that the inverter 24 (described below), which is a component part of the power loss compensation circuit for the measuring resistor $R_M$, simultaneously serves as an inverter 9 of the support coil power loss compensation, so that merely a single component is required here.

The A/D converter 10' of FIG. 3 differs in two respects from the A/D converter 10 of FIG. 2. The first respect concerns the configuration of the comparator reference voltage applied at the reference voltage input 222 of the comparator 22. Whereas in the A/D converter 10 of FIG. 2, only ground is connected here, in the case of the A/D converter 10' of FIG. 3, the output of an additional integrator 30 is connected to the comparator reference voltage input 222. The additional integrator 30 comprises an operational amplifier 301 with an inverting input 302, a non-inverting input 303 and an output 304. Whereas the non-inverting input 303 is connected to ground, the inverting input 302 is connected via a capacitor 305 to the output 304. The input of the integrator 30 is applied, via an input resistor 32, to the output 126 of the integrator 12. The mode of operation of the additional integrator 30 lies therein that it averages and inverts the output signal of the integrator 12 and makes this averaged signal available to the comparator 22 as the comparator reference voltage, in other words, in the comparator 22, the output signal of the integrator 12 is no longer compared with ground, but with its own average value. Therefore, a voltage signal with no direct component is applied at the capacitor 125 of the integrator 12. In this manner, the direct voltage-related faults of the capacitor 125, such as leakage currents and dielectric absorption are prevented or at least reduced. It is thereby possible without any sacrifice of functionality in the integrator 12, to use less high quality capacitor types as the capacitor 125, and this results in a marked cost reduction for the circuit, or alternatively, with unchanged capacitor quality, to an improvement in measuring quality.

The second respect in which the A/D converter of FIG. 3 differs from that of FIG. 2 is that the measurement voltage input 14 is connected via an inverter 24, i.e. via a voltage amplifier with a gain factor of "−1", and the heating resistor $R_{MH}$ is connected to the output of the reference voltage switch 16. The resistance value of the heating resistor $R_{MH}$ is equal to the resistance value of the measuring resistor $R_M$. Similarly, the resistance value of the reference resistor $R_{ref}$ is equal to the resistance value of the measuring resistor $R_M$. This results in a constancy of power loss, i.e. a duty factor-independence of the power loss, for the whole A/D converter 10'.

Figure 4:
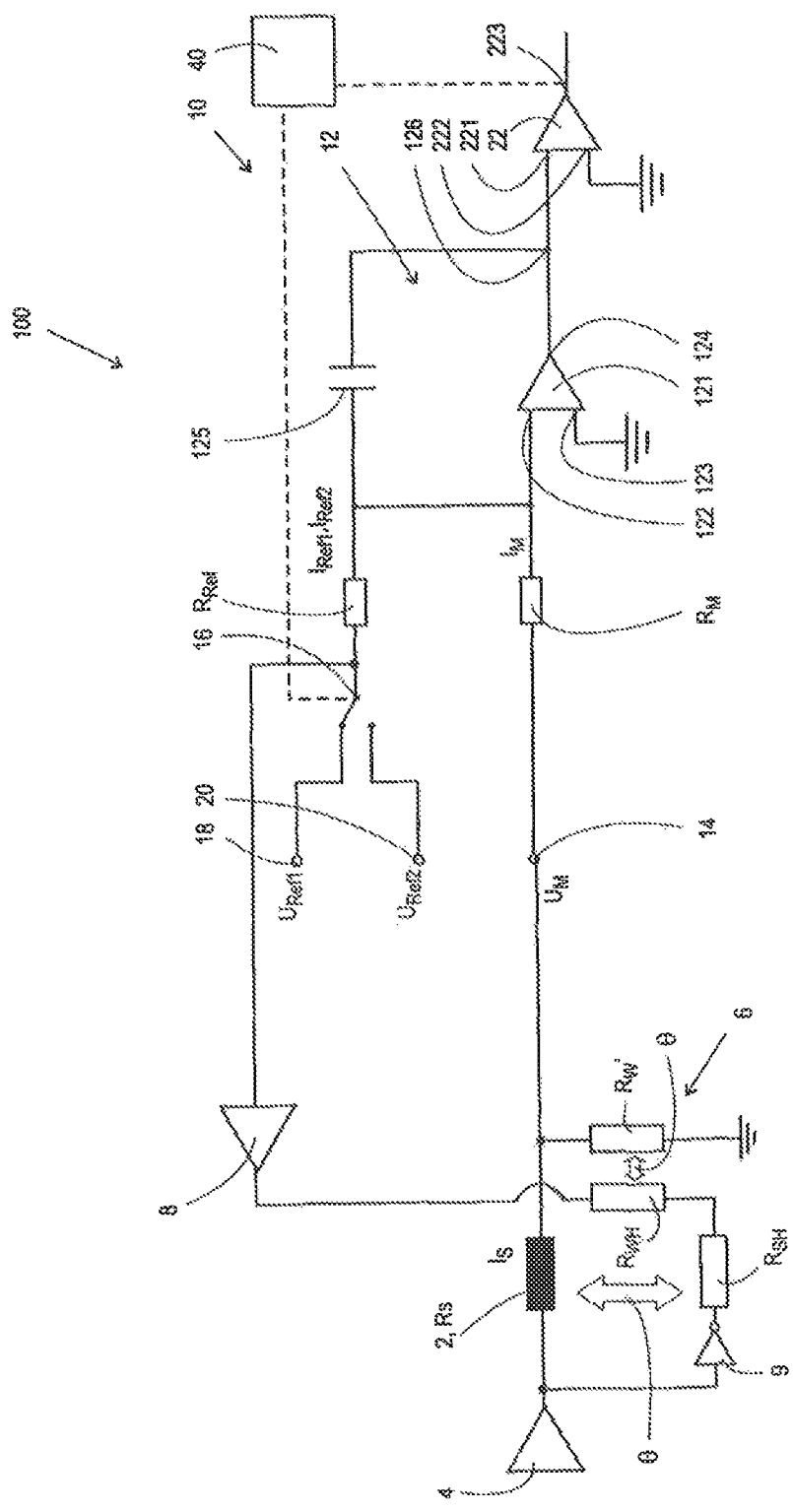
FIG. 4 is a sketch showing the principle of a first embodiment of an electronic measurement value detection device of a force-measuring apparatus according to the second variant of the invention.

FIG. 4 shows a further development of the device of FIG. 1. The current/voltage conversion is carried out here by a passive current/voltage converter 6 with the shunt resistor $R_W'$ thereof. This is provided with the same reference sign as the converter resistor $R_W$ in FIGS. 2 and 3, by reason of their comparable tasks. The shunt resistor $R_W'$ is connected to ground between the support coil 2 and the measurement voltage input 14 of the A/D converter 10. A voltage amplifier 8 is provided, as in the embodiment of FIGS. 2 and 3, at the input of which the respective present reference voltage $U_{Ref1}$ or $U_{Ref2}$ is applied. The output of the voltage amplifier is applied to one side of the heating resistors $R_{SH}$ and $R_{WH}$ which are connected in series and, to their other side, the output voltage of the controller 4 which is inverted by the inverter 9 is applied. The resistance value of the heating resistor $R_{WH}$ corresponds to the resistance value of the shunt resistor $R_W'$; the resistance value of the heating resistor $R_{SH}$ corresponds to the resistance value of the support coil 2. The heating resistor $R_{SH}$ is thermally coupled, as indicated by a thermal coupling arrow $\Theta$, to the support coil 2. With a suitable selection of the gain factor of the voltage amplifier 8, specifically $g=(R_{WH}+R_{SH})/R_{WH}$ or $g=(R_W+R_S)/R_W$, a constancy results, as can be shown mathematically, i.e. the duty factor-independence of the power loss which arises at the support coil 2, the heating resistors $R_{SH}$ and $R_{WH}$ and the shunt resistor $R_W'$ as a total and averaged over a measuring clock cycle. The power loss is therefore no longer measurement value-dependent, so that thermal effects always have the same influence regardless of the actual measurement value.

Figure 5:
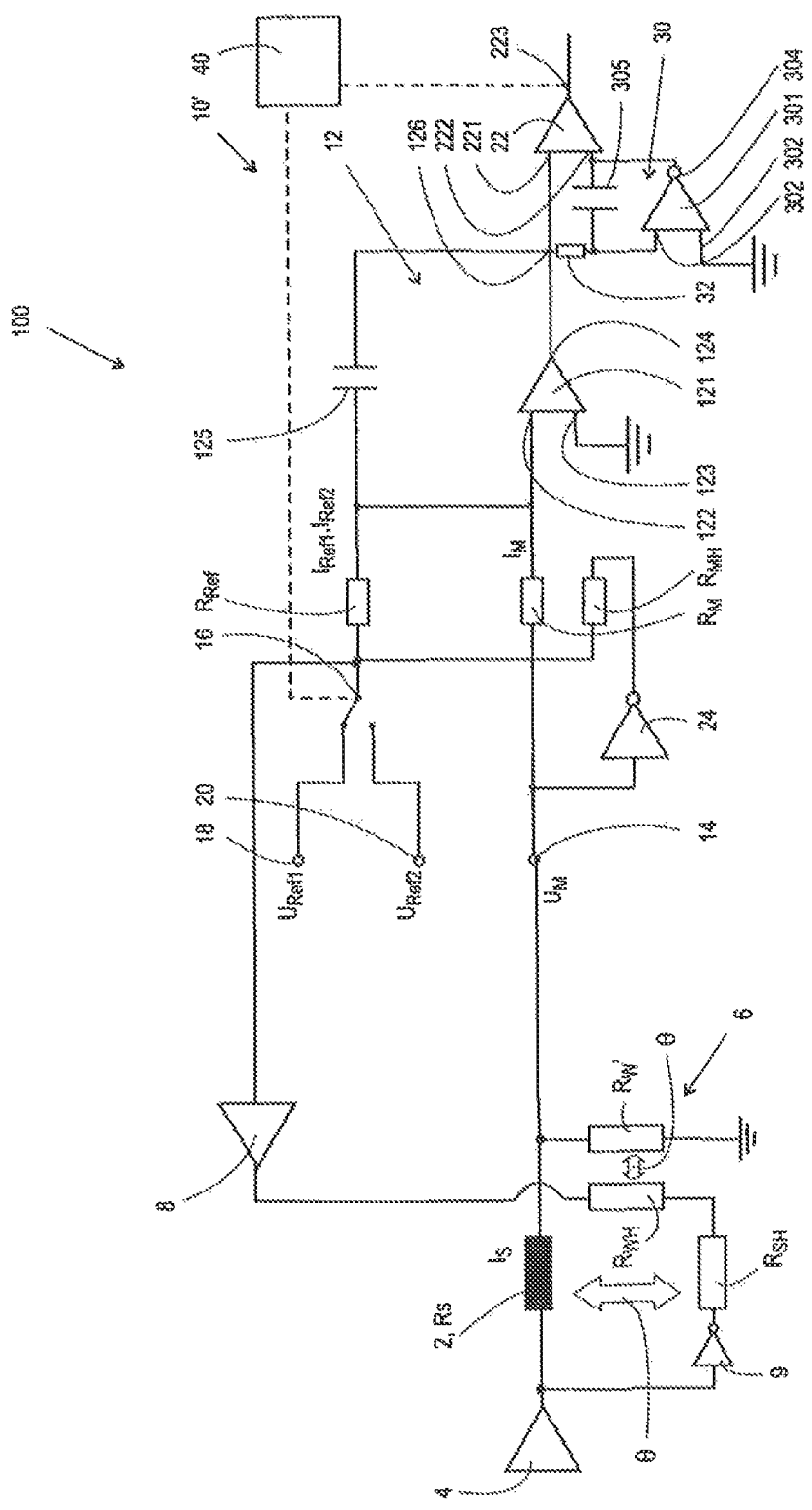
FIG. 5 is a sketch showing the principle of a second embodiment of an electronic measurement value detection device of a force-measuring apparatus according to the second variant of the invention.

Finally, FIG. 5 shows a further development of the device of FIG. 4, which has, in particular, a modified A/D converter 10' according to FIG. 3.

The embodiments covered by the detailed description and shown in the figures are merely illustrative exemplary embodiments of the present invention. A broad spectrum of possible variations will be evident to a person skilled in the art, based on the present disclosure.

REFERENCE SIGNS

100 Measurement value detection device
2 Support coil
4 Controller
6 Current/voltage converter
7 Difference amplifier
8 Voltage amplifier
9 Inverter
10, 10' A/D converter
12 First integrator
121 Operational amplifier of 12
122 Inverting input of 121
123 Non-inverting input of 121
124 Output of 121
125 Capacitor of 12
126 Output of 12
14 Measurement voltage input
16 Reference voltage switch
18 First reference voltage input
20 Second reference voltage input
22 Comparator
221 Test voltage input of 22
222 Reference voltage input of 22
223 Output of 22
24 Inverter
30 Second integrator
301 Operational amplifier of 30
302 Inverting input of 301
303 Non-inverting input of 301
304 Output of 301
305 Capacitor of 30
32 Input resistor before 30
40 Control device
$R_S$ Support coil resistor
$R_{SH}$ Heating resistor
$R_W$ Converter resistor
$R_W'$ Shunt resistor
$R_{WH}$ Heating resistor
$R_M$ Measuring resistor
$R_{MH}$ Heating resistor
$R_{ref}$ Reference resistor
$I_S$ Coil current
$U_M$ Measurement voltage
$I_M$ Measurement current
$U_{Ref1}$ First reference voltage
$I_{Ref1}$ First reference current
$U_{Ref2}$ Second reference voltage
$I_{Ref2}$ Second reference current
T Duration of measuring clock cycle
t1 First measuring phase (integration phase)
$\tau$ Second measuring phase (deintegration phase)
$\Theta$ Coupling arrow
$\delta$ Duty factor
g Gain factor

The invention claimed is:

1. An electromagnetically force-compensating force-measuring apparatus, comprising:
a support coil mounted in a permanent magnet arrangement and through which a force-dependent coil current generated by a controller flows during operation as an output, and
an integrating analog/digital (A/D) converter configured to convert an electrical signal, representative of the coil current and applied to a measurement voltage input of the A/D converter, into a digital output signal,
wherein the A/D converter is connected at a reference voltage input of the A/D converter to a reference voltage source which has two reference voltages of the same magnitude and opposite polarity relative to one another, and alternately connects each of the two reference voltages via a reference voltage switch to an integrator of the A/D converter, wherein a ratio of intervals in which the reference voltages are each respectively connected to the integrator within a measuring clock cycle provides a measure of the coil current that flows during the operation,
and wherein the output of the controller is connected, via a first heating resistor which is thermally coupled to the support coil, to an output of a voltage amplifier, the input of which amplifier is connected to an output of the reference voltage switch, wherein a current/voltage converter is connected downstream of the support coil, an output of the current/voltage converter being connected to the measurement voltage input of the A/D converter and, via an inverter and a second heating resistor, to the input of the voltage amplifier, wherein
a resistance value of the first heating resistor is equal to a resistance value of the support coil,
a resistance value of the second heating resistor is equal to a conversion factor of the current/voltage converter and
a gain factor of the voltage amplifier is equal to a ratio of the resistance value of the first heating resistor to the resistance value of the second heating resistor.

2. The force-measuring apparatus as claimed in claim 1, wherein
the current/voltage converter comprises a converter resistor connected in series between the support coil and the input of the A/D converter, and a difference amplifier connected in parallel to the current/voltage converter.

3. The force-measuring apparatus as claimed in claim 1, wherein
the inverter is a component of a power compensation circuit within the A/D converter.

4. An electromagnetically force-compensating force-measuring apparatus, comprising:
- a support coil mounted in a permanent magnet arrangement and through which a force-dependent coil current generated by a controller flows during operation as an output, and
- an integrating analog/digital (A/D) converter configured to convert an electrical signal, representative of the coil current and applied to a measurement voltage input of the A/D converter, into a digital output signal, wherein the A/D converter is connected at a reference voltage input of the A/D converter to a reference voltage source which has two reference voltages of the same magnitude and opposite polarity relative to one another, and alternately connects each of the two reference voltages via a reference voltage switch to an integrator of the A/D converter, wherein a ratio of intervals in which the reference voltages are each respectively connected to the integrator within a measuring clock cycle provides a measure of the coil current that flows during the operation, and wherein the output of the controller is connected, via an inverter, a first heating resistor which is thermally coupled to the support coil, and a second heating resistor to an output of a voltage amplifier, the input of which amplifier is connected to an output of the reference voltage switch, wherein a passive current/voltage converter with a shunt resistor connected to ground is connected downstream of the support coil, an output of the current/voltage converter being connected to the measurement voltage input of the A/D converter, wherein
- a resistance value of the first heating resistor is equal to a resistance value of the support coil,
- a resistance value of the second heating resistor is equal to a resistance value of the shunt resistor, and
- a gain factor of the voltage amplifier is equal to a ratio of a total of the resistance values of the first and second heating resistors to the resistance value of the second heating resistor.

* * * * *